US008274610B2

(12) United States Patent
Clay, Jr.

(10) Patent No.: US 8,274,610 B2
(45) Date of Patent: Sep. 25, 2012

(54) RFID-BASED WIRELESS REMOTE CONTROL USING VARIABLE ID FIELD

(75) Inventor: William J. Clay, Jr., San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 469 days.

(21) Appl. No.: 12/569,034

(22) Filed: Sep. 29, 2009

(65) Prior Publication Data

US 2011/0075051 A1 Mar. 31, 2011

(51) Int. Cl.
*H04N 7/01* (2006.01)

(52) U.S. Cl. ........ 348/734

(58) Field of Classification Search ........ 348/734, 348/725, 552, 553; 340/825.72, 825.69, 340/10.1, 4.61

See application file for complete search history.

(56) References Cited

U.S. PATENT DOCUMENTS

| | | | | |
|---|---|---|---|---|
| 5,850,187 | A * | 12/1998 | Carrender et al. | 340/10.6 |
| 6,133,833 | A * | 10/2000 | Sidlauskas et al. | 340/572.1 |
| 6,531,964 | B1 * | 3/2003 | Loving | 340/12.51 |
| 8,115,596 | B2 * | 2/2012 | Lund | 340/10.1 |
| 2005/0246738 | A1 * | 11/2005 | Lockett et al. | 725/43 |
| 2006/0197676 | A1 | 9/2006 | Smith | |
| 2008/0094181 | A1 * | 4/2008 | Lenevez et al. | 340/10.4 |
| 2011/0075051 | A1 * | 3/2011 | Clay, Jr. | 348/734 |

* cited by examiner

*Primary Examiner* — Paulos Natnael

(74) *Attorney, Agent, or Firm* — John L. Rogitz

(57) ABSTRACT

A TV remote control is powered using RFID principles from an electric field generated by the TV and so the RC requires no batteries. The RC changes the ID field of the data packet it transmits based on what button was pushed so that a first button is associated with a first ID, a second button is associated with a second ID, and so on. In this way, only a single RFID tag need be provided in the RC.

17 Claims, 1 Drawing Sheet

RFID-BASED WIRELESS REMOTE CONTROL USING VARIABLE ID FIELD

FIELD OF THE INVENTION

The present application is directed generally to RFID-based wireless TV remote controls without batteries that use variable IDs to convey commands.

BACKGROUND OF THE INVENTION

TV remote controls (RC) have been provided that use radiofrequency identification (RFID) principles to send commands from a TV RC to a TV. Passive RFID tags in the RC transmit data to the TV receiver through an electric field which is generated by the TV receiver. Typically, such RCs incorporate multiple RFID tags each corresponding to a particular button push, see, e.g., USPP 2008/0094181. As critically recognized herein, it is desirable to minimize the number of RFID tags that must be used in a RC.

SUMMARY OF THE INVENTION

According to present principles, the "ID" field of the RFID tag in a RC changes based upon the particular key pressed of the user. In this way, only a single RFID tag need be incorporated in the RC.

Accordingly, a TV remote control (RC) is powered using RFID principles from an electric field generated by a controlled component. The RC includes a housing containing no batteries and plural command elements on the housing and manipulable by a person. A processor receives signals indicating manipulation of a command element and establishes an ID field for a data packet based on what command element is indicated as having been manipulated. No more than two command elements are associated with the same ID such that at least a first command element is associated with a first ID and at least a second command element is associated with a second ID different from the first command element. One and only one RFID tag is in the RC to send the packet under control of the processor to the controlled component.

In some embodiments each and every command element on the RC is associated with a unique ID different from IDs associated with other command elements. In other embodiments a pair of up/down command elements are associated with a single ID unique to the pair. In this latter embodiment the packet can include a data field indicating "up" or "down". A computer readable storage medium can be in the RC and can be accessible to the processor for storing correlations between IDs and commands.

In another aspect, a method includes powering, using an electric field generated by a component, a batteryless remote control (RC) having plural keys. At least first and second keys are associated with respective first and second IDs. The method includes receiving a first signal indicating manipulation of the first key and in response to receiving the first signal, configuring a first command packet to have the first ID and a data field. The first command packet is sent to the component to cause the component to execute a command associated with the first command packet. The method further includes receiving a second signal indicating manipulation of the second key and in response to receiving the second signal, configuring a second command packet to have the second ID and a data field. The second command packet is sent to the component to cause the component to execute a command associated with the second command packet.

In another aspect, a system includes a component to be controlled and an RFID reader assembly in the component to be controlled and generating an electric field. The system further includes a portable remote control (RC) powered by the electric field. Plural command elements are on the RC. In response to manipulation of a command element, a data packet is generated in the RC with an ID field correlated to the command element such that an ID in the ID field depends on what command element is manipulated, such that, at least a first command element is associated with a first ID and at least a second command element is associated with a second ID different from the first command element. An RFID tag is in the RC for sending the packet to the controlled component.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
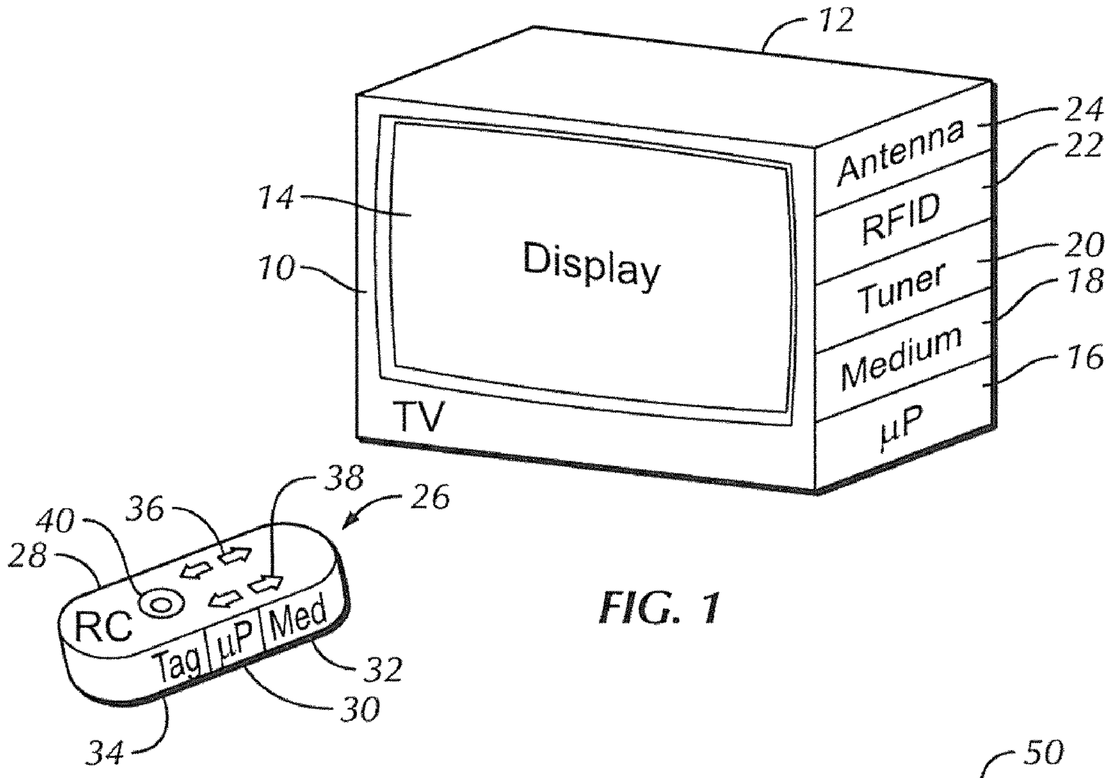
FIG. 1 is a schematic diagram of an example system in accordance with present principles.

Referring initially to FIG. 1, a component to be controlled by a remote control (RC) may be instantiated in one implementation by a TV 10 with TV chassis 12 bearing a TV display 14 presenting demanded images under control of a TV processor 16. The TV processor 16 accesses a tangible computer readable medium 18 such as solid state or disk-based storage to obtain data and to execute code stored on the medium 18. A TV tuner 20 may also be supported on the chassis 12.

As shown in FIG. 1, an RFID reader assembly 22 is supported in the chassis 12 or dangles therefrom, but in any case communicates with the TV processor 16. The RFID reader assembly 22 includes, among other components, an RFID reader and an RFID electric field generator. An RFID antenna 24 may communicate with the RFID reader assembly 22.

The electric field generated by the RFID reader assembly 22 powers a remote control (RC) 26 that is sufficiently near the TV 10 such that the RC 26 need contain no battery to function. The RC 26 includes a portable hand-held housing 28 typically holding an RC processor 30 accessing a tangible computer readable storage medium 32 containing data and/or code executable by the RC processor 30. Also, the RC 26 includes an RFID tag 34 and preferably includes one and only one RFID tag 34 for receiving power from the electric field generated by the RFID reader assembly 22 and for sending RF signals to the RFID reader assembly 22 in accordance with further description below.

Typically, multiple command elements such as buttons or keys are disposed on the RC housing 28 and can be manipulated by a person to generate commands for execution thereof by the TV processor 16. In the example non-limiting embodiment shown, volume control up/down keys 36 are provided on the RC as are channel up/down keys 38. An enter key 40 may also be provided. Other keys may be provided as desired.

Figure 2:
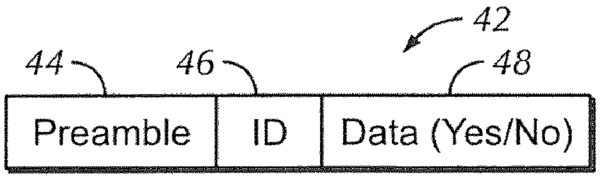
FIG. 2 is a schematic diagram of an example RC RFID data packet.

FIG. 2 shows a data packet 42 that is generated by the RC 26 when a key is manipulated. The data packet 42 is sent using RFID principles by the RFID tag 34 to the RFID reader assembly 22 in the TV 10.

As shown, the data packet 42 may include a preamble 44 to alert the RFD reader assembly 22 that a command is incoming. The data packet 42 includes an ID field 46 which is the field that conventionally uniquely identifies the RFID tag 34, but that is used differently in accordance with principles below. A data field 48 may follow the ID field 46. As set forth further below, the data field 48 may simply include a single bit meaning that the packet 42 represents a command, or it may include a binary one or zero indicating one of two binary states in some implementations, as explained further below.

Figure 3:
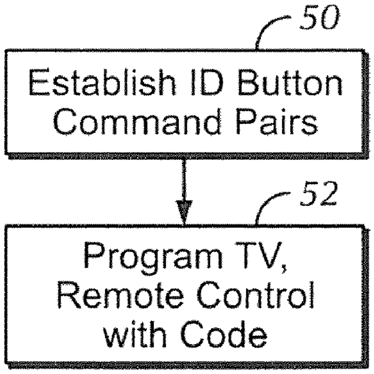
FIG. 3 is a flow chart of example set up logic.

Now referring to FIG. 3, at block 50 ID-key pairs are established, typically by the manufacturer of the TV 10/RC 26. Specifically, in one embodiment, each key 36-40 shown on the RC 26 in FIG. 1 is associated with a respective ID. Thus, in this first embodiment each ID indicates a specific command, e.g., channel up, channel down, volume up, volume down, enter. In another embodiment each key pair 36, 38 is associated with a respective ID. Thus, in this second embodiment first and second IDs indicate a channel change or a volume change respectively, and a third ID may indicate "enter". In this second embodiment the data field 48 binary value is established to indicate the direction of the change. The TV 10 and RC 26 are programmed with the ID-to-key correlations at block 52.

Figure 4:
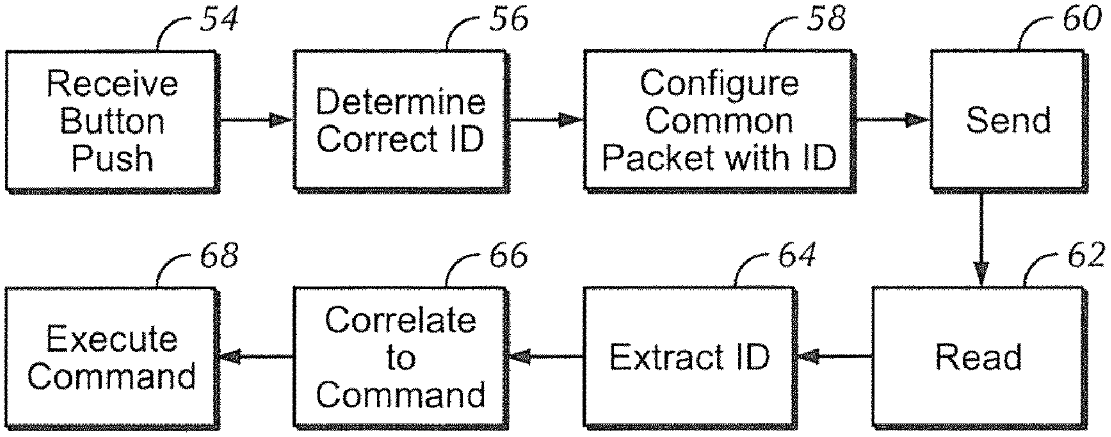
FIG. 4 is a flow chart of example operating logic.

FIG. 4 illustrates example operating logic. Commencing at block 54, a key manipulation is received by the RC processor 30. Moving to block 56, the RC processor 30 accesses the RC medium 32 to determine the ID corresponding to the manipulated key. A command packet such as the packet 42 in FIG. 2 is configured accordingly at block 58.

In the first embodiment described above in which every key is correlated to a unique ID, the ID field 46 contains that ID. The data field 48 may be empty or may simply include a dummy signal indicating that the command is active or otherwise in existence, but in any case the data field may be identical for every command regardless of ID.

On the other hand, in the second embodiment described above in which up/down key pairs are associated with a single ID between them, if the keystroke is one of a pair of keys the ID field 46 contains the ID associated with that pair. The data field 48 then contains a signal, potentially binary only, indicating which key in the pair was manipulated and, thus, which of the two commands associated with ID is to be executed. A binary "zero" for instance can indicate "down" while a binary "one" can indicate "up".

In any case, the packet is sent by the RC 26 at block 60 and read by the TV 10 at block 62. At block 64 in the first embodiment the ID is extracted from the ID field 46 and correlated to the corresponding command at block 66. For instance, a particular ID might be correlated to "change volume up one setting". In contrast, at block 64 in the second embodiment the ID is extracted from the ID field and, if it represents a pair of keys, the binary information is extracted from the data field 48. Then, at block 66 the ID is correlated to a command, e.g., "change volume", and the binary data from the data field is correlated to a command direction, e.g., "up". The command is executed at block 68.

While the particular RFID-BASED WIRELESS REMOTE CONTROL USING VARIABLE ID FIELD is herein shown and described in detail, it is to be understood that the subject matter which is encompassed by the present invention is limited only by the claims.

What is claimed is:

1. A TV remote control (RC) powered using RFID principles from an electric field generated by a controlled component, comprising:

a housing containing no batteries;

plural command elements on the housing and manipulable by a person;

a processor receiving signals indicating manipulation of a command element, the processor establishing an ID field for a data packet based on what command element is indicated as having been manipulated and a direction field indicating a direction of a command represented in the packet, wherein no more than two command elements are associated with the same ID such that at least a first command element is associated with a first ID and at least a second command element is associated with a second ID different from the first command element; and one and only one RFID tag in the RC sending the packet under control of the processor to the controlled component.

2. The RC of claim 1, wherein each and every command element on the RC is associated with a unique ID different from IDs associated with other command elements.

3. The RC of claim 2, wherein a pair of up/down command elements are associated with a single ID unique to the pair.

4. The RC of claim 3, wherein the packet includes a data field indicating "up" or "down".

5. The RC of claim 1, comprising a computer readable storage medium in the RC accessible to the processor and storing correlations between IDs and commands.

6. A method comprising:

powering, using an electric field generated by a component, a batteryless remote control (RC) having plural keys, at least first and second keys being associated with respective first and second ID;

receiving a first signal indicating manipulation of the first key;

in response to receiving the first signal, configuring a first command packet to have the first ID and a data field;

sending the first command packet to the component to cause the component to execute a command associated with the first command packet;

receiving a second signal indicating manipulation of the second key;

in response to receiving the second signal, configuring a second command packet to have the second ID and a data field; and sending the second command packet to the component to cause the component to execute a command associated with the second command packet, wherein the second ID indicates the command associated with the second command packet and the second command packet includes a data field to indicate a direction for the command associated with the second command packet.

7. The method of claim 6, wherein the first key is an "enter" key and the second key is an "up" or "down" key.

8. The method of claim 7, wherein the second key and a third key together establish an up/down pair, and the third key is associated with a third ID different from the second ID.

9. The method of claim 7, wherein the second key and a third key together establish an up/down pair, and the third key is associated with the second ID.

10. A system comprising:

a component to be controlled;

an RFID reader assembly in the component to be controlled and generating an electric field;

a portable remote control (RC) powered by the electric field;

plural command elements on the RC;

wherein in response to manipulation of a command element, a data packet is generated in the RC with an ID field correlated to the command element such that an ID in the ID field depends on what command element is manipulated, such that at least a first command element is associated with a first ID and at least a second command element is associated with a second ID different from the first command element; and an RFID tag in the RC sending the packet to the controlled component, wherein the packet includes a data field indicating a command direction.

11. The system of claim 10, wherein no more than two command elements are associated with the same ID.

12. The system of claim 10, wherein the RC contains no batteries to operate.

13. The system of claim 10, wherein each and every command element on the RC is associated with a unique ID different from JDs associated with other command elements.

14. The system of claim 12, wherein a pair of up/down command elements are associated with a single ID unique to the pair.

15. The system of claim 10, comprising a computer readable storage medium in the RC accessible to a processor in the RC and storing correlations between IDs and commands.

16. The system of claim 10, wherein one and only one RFID tag is in the RC.

17. The system of claim 10, wherein the component to be controlled is a TV.

* * * * *